US010678533B2

(12) United States Patent
Krishnaswamy et al.

(10) Patent No.: US 10,678,533 B2
(45) Date of Patent: *Jun. 9, 2020

(54) ENHANCED SERVER FARM PATCHING SYSTEM FOR ENABLING DEVELOPERS TO OVERRIDE OFF-PEAK PATCHING SCHEDULES

(71) Applicant: Microsoft Technology Licensing, LLC, Redmond, WA (US)

(72) Inventors: Chandramouleeswaran Krishnaswamy, Bellevue, WA (US); Jianfeng Cai, Redmond, WA (US); Mustafaraj M. Dhrolia, Redmond, WA (US); Rahul Nigam, Bothell, WA (US); Mark Raymond Gilbert, Issaquah, WA (US); Peter Kenneth Harwood, Bellevue, WA (US); Brian Gregory O'Connor, Kenmore, WA (US); Divyachapan Sridharan Padur, Bothell, WA (US); Zohar Raz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,216

(22) Filed: May 10, 2019

(65) Prior Publication Data
US 2019/0303132 A1  Oct. 3, 2019

Related U.S. Application Data

(63) Continuation of application No. 15/940,778, filed on Mar. 29, 2018, now Pat. No. 10,289,403.

(51) Int. Cl.
*G06F 8/65* (2018.01)
*G06F 11/34* (2006.01)
(Continued)

(52) U.S. Cl.
CPC .................. *G06F 8/65* (2013.01); *G06F 8/71* (2013.01); *G06F 11/3423* (2013.01);
(Continued)

(58) Field of Classification Search
CPC . H04L 43/16; H04L 41/12; G06F 8/65; G06F 11/3423; G06F 11/3428;
(Continued)

(56) References Cited

U.S. PATENT DOCUMENTS 6,721,713 B1  4/2004  Guheen et al.
8,037,453 B1  10/2011  Zawadzki
(Continued)

OTHER PUBLICATIONS

"Notice of Allowance Issued in U.S. Appl. No. 15/940,835", dated Oct. 22, 2019, 8 Pages.
(Continued)

*Primary Examiner* — Marina Lee
(74) *Attorney, Agent, or Firm* — Newport IP, LLC; Mike R. Cicero

(57) ABSTRACT

A system to reduce strain on server farm computing resources by over-riding "off-peak" patching schedules in response to performance failures occurring on a server farm. Embodiments disclosed herein determine a patching schedule for causing builds of patches to be sequentially installed on server farms during an off-peak usage time-range. Responsive to a performance failure occurring on the server farm, embodiments disclosed herein identify a particular patch that is designed to resolve the performance failure. Then, the patching schedule is over-ridden to expedite an out-of-sequence installation of whichever build is first to include the particular patch. Because resolution of the performance failure is expedited, the impact of the performance
(Continued)

failure on the computing resources of the server farm is reduced as compared to existing server farm patching systems.

20 Claims, 5 Drawing Sheets

(51) Int. Cl.
| | |
|---|---|
| *G06F 8/71* | (2018.01) |
| *H04L 12/26* | (2006.01) |
| *H04L 12/24* | (2006.01) |

(52) U.S. Cl.
CPC ...... *G06F 11/3428* (2013.01); *G06F 11/3442* (2013.01); *H04L 41/12* (2013.01); *H04L 43/16* (2013.01)

(58) Field of Classification Search
CPC .... G06F 8/61; G06F 11/3442; G06F 11/3433; G06F 11/302; G06F 11/0793; G06F 8/71
USPC .......................................... 717/168–178, 121
See application file for complete search history.

(56) References Cited

U.S. PATENT DOCUMENTS

| | | | |
|---|---|---|---|
| 8,819,632 | B2 | 8/2014 | Williams et al. |
| 8,819,655 | B1 | 8/2014 | Hopwood et al. |
| 8,972,963 | B2 | 3/2015 | Baset et al. |
| 9,098,375 | B2 | 8/2015 | Narkinsky et al. |
| 9,104,962 | B2 | 8/2015 | Lee et al. |
| 9,195,455 | B2 | 11/2015 | Sriram et al. |
| 9,491,072 | B2 | 11/2016 | Raghunathan et al. |
| 9,497,072 | B2 | 11/2016 | Gates et al. |
| 9,772,837 | B2 | 9/2017 | Kalidindi et al. |
| 10,217,067 | B2* | 2/2019 | Cavalcante ........ G06Q 10/0631 |
| 10,289,403 | B1* | 5/2019 | Krishnaswamy ......... G06F 8/71 |
| 10,374,930 | B2* | 8/2019 | Cai ....................... H04L 67/325 |
| 2001/0055303 | A1 | 12/2001 | Horton et al. |
| 2003/0126202 | A1 | 7/2003 | Watt |
| 2006/0075306 | A1 | 4/2006 | Chandrasekaran |
| 2006/0277442 | A1 | 12/2006 | Lantz et al. |
| 2007/0010983 | A1 | 1/2007 | Bauer et al. |
| 2007/0116185 | A1 | 5/2007 | Savoor et al. |
| 2007/0162514 | A1 | 7/2007 | Civetta et al. |
| 2007/0164849 | A1 | 7/2007 | Haeberle et al. |
| 2008/0220873 | A1 | 9/2008 | Lee et al. |
| 2008/0288584 | A1 | 11/2008 | Colantuono et al. |
| 2009/0100419 | A1 | 4/2009 | Childress et al. |
| 2009/0187899 | A1* | 7/2009 | Mani ........................ G06F 8/65 717/168 |
| 2009/0275414 | A1 | 11/2009 | Lee et al. |
| 2010/0100899 | A1 | 4/2010 | Bradbury et al. |
| 2010/0257517 | A1 | 10/2010 | Sriram et al. |
| 2012/0011406 | A1 | 1/2012 | Williams et al. |
| 2013/0152047 | A1 | 6/2013 | Moorthi et al. |
| 2013/0212185 | A1 | 8/2013 | Pasquero et al. |
| 2013/0340074 | A1* | 12/2013 | Ayachitula ............ G06F 21/577 726/22 |
| 2015/0012624 | A1* | 1/2015 | Geiger .................. H04L 41/082 709/221 |
| 2015/0019706 | A1 | 1/2015 | Raghunathan et al. |
| 2015/0089488 | A1 | 3/2015 | Anderson et al. |
| 2015/0178063 | A1* | 6/2015 | Narkinsky .............. G06F 8/658 717/168 |
| 2015/0280968 | A1 | 10/2015 | Gates et al. |
| 2015/0280969 | A1 | 10/2015 | Gates et al. |
| 2015/0281011 | A1 | 10/2015 | Gates et al. |
| 2015/0288557 | A1 | 10/2015 | Gates et al. |
| 2015/0288558 | A1 | 10/2015 | Gates et al. |
| 2016/0018125 | A1 | 1/2016 | Hamstra et al. |
| 2016/0085543 | A1 | 3/2016 | Islam et al. |
| 2016/0092188 | A1 | 3/2016 | Kuchibhotla et al. |
| 2016/0269312 | A1* | 9/2016 | Cavalcante ........ G06Q 10/0631 |
| 2016/0277404 | A1 | 9/2016 | Chen et al. |
| 2016/0364229 | A1 | 12/2016 | Higginson et al. |
| 2017/0034023 | A1 | 2/2017 | Nickolov et al. |
| 2017/0075749 | A1 | 3/2017 | Ambichl et al. |
| 2017/0090904 | A1 | 3/2017 | Shida et al. |
| 2017/0334023 | A1 | 11/2017 | Mohr |
| 2018/0131574 | A1* | 5/2018 | Jacobs ................... H04L 67/22 |
| 2018/0131579 | A1 | 5/2018 | Jacobs et al. |
| 2018/0143868 | A1 | 5/2018 | Johnston et al. |
| 2019/0303127 | A1 | 10/2019 | Krishnaswamy et al. |

OTHER PUBLICATIONS

Beattie, et al., "Timing the Application of Security Patches for Optimal Uptime", In Proceedings of LISA: Sixteenth Systems Administration Conference, Nov. 3, 2002, 17 Pages.
"BigFix", Retrieved from: https://endpointservicesillinois.edu/BigFix, Retrieved Date: Feb. 7, 2018, 4 Pages.
"Non Final Office Action Issued in U.S. Appl. No. 15/940,835", dated Jan. 22, 2019, 25 Pages.
"Notice of Allowance issued in U.S. Appl. No. 15/940,835", dated Jul. 10, 2019, 13 Pages.
Barr, Jeff, "AWS Managed Services—Infrastructure Operations Management for the Enterprise", Retrieved from: https://aws.amazon.com/blogs/aws/aws-managed-services-infrastructure-operations-management-for-the-enterprise/, Dec. 12, 2016, 7 Pages.
Brehob, et al., "Applying Extra-Resource Analysis to Load Balancing", In Proceedings of the eleventh annual ACM-SIAM symposium on Discrete algorithms, Jan. 9, 2000, pp. 560-561.
Lam, et al., "Performance Guarantee for Online Deadline Scheduling in the Presence of Overload", In Proceedings of the Twelth Annual ACM-SIAM Symposium on Discrete Algorithms, Jan. 7, 2001, pp. 755-764.
Nadeau, Charles, "Working with Problem and Incident Tickets", Retrieved from: https://support.zendesk.com/hc/en-us/articles/203691086-Working-with-problem-and-incident-tickets, Dec. 8, 2017, 20 Pages.

* cited by examiner

ENHANCED SERVER FARM PATCHING SYSTEM FOR ENABLING DEVELOPERS TO OVERRIDE OFF-PEAK PATCHING SCHEDULES

PRIORITY APPLICATION

This application claims the benefit of and priority to U.S. Nonprovisional application Ser. No. 15/940,778 filed on Mar. 29, 2018, entitled "ENHANCED SERVER FARM PATCHING SYSTEM FOR ENABLING DEVELOPERS TO OVERRIDE OFF-PEAK PATCHING SCHEDULES," (now U.S. Pat. No. 10,289,403), the entire contents of which are incorporated herein by reference.

BACKGROUND

Server farms that facilitate cloud computing resources such as, for example, Software as a Service (SaaS) applications may receive periodic software patches for a variety of reasons. For example, a server farm that facilitates a SaaS email application may receive and install periodic software patches for the SaaS email application to improve existing features, add new features, correct security vulnerabilities, or fix bugs. Installing a software patch may temporarily have a negative impact to the performance or stability of the machines being updated (e.g., patched). Such negative impacts may be particularly disruptive during peak business hours when large numbers of users are accessing server farm computing resources.

Server farm patching systems mitigate these issues by causing software patches to be installed in sequence during off-peak hours. Off-peak hours may be determined for a particular server farm based on the geographic region for the tenants served by that particular server farm. Then, sequential builds of patches may be chronologically transmitted to the particular server farm for system updates to be performed during the determined off-peak hours.

Unfortunately, some system updates cause software regressions that result in features, of software code, demanding increased processing cycles and/or memory usage as compared to previous versions of the software code. Even worse, some software regressions cause features of software code to stop functioning altogether. Under these circumstances, performing subsequent software updates by installing patches chronologically and/or during off-peak hours may delay resolution of a software regression—the result being increased strain on the inherently limited computing resources for server farms affected by software regressions.

It is with respect to these and other considerations that the disclosure made herein is presented.

SUMMARY

Technologies described herein enable a developer to over-riding "off-peak" patching schedules in response to performance failures occurring on a server farm. Embodiments disclosed herein determine a patching schedule for causing builds of software patches (referred to herein as "patches") to be sequentially installed on server farms during an off-peak usage time-range and/or when an activity level is below a threshold activity level. Responsive to a performance failure occurring with respect to a functionality of the server farm, embodiments disclosed herein enable a developer to flag the server farm and/or a particular patch that is designed to resolve the performance failure. Then, based on the flag(s) placed by the developer, the patching schedule is over-ridden to expedite an out-of-sequence installation of whichever build is first to include the particular patch. In this way, a developer of a patch that resolves a specific performance failure may be empowered to expedite distribution of this patch on a highly granular level to server farms that are currently being affected by the specific performance failure. At the same time, other "un-affected" server farms are not subjected to unnecessary service disruptions which do not alleviate some immediate pain (e.g., workflow disruption) being experienced by tenants thereof.

Because installation of the build that initially includes the patch is expedited, the impact of the performance failure on the computing resources of the server farm is reduced as compared to existing server farm patching systems. For example, if the performance failure corresponds to a software regression, expediting a fix to the software regression will reduce utilization of computing resources such as processor cycles, power, and memory to name a few. Other technical benefits not specifically mentioned herein can also be realized through implementations of the disclosed subject matter.

In some embodiments, the builds of patches are arranged in a sequence of builds in which successive builds within the sequence include incremental additions to a set of patches. For example, a first build may include only a first patch whereas a second build includes both the first patch and a second patch. Further adding to this example, a third build may include a third patch in addition to both of the first patch and the second patch. Stated plainly, each successive build may include all of the patches which were included in the immediately previous build and also one or more additional patches. Thus, with respect to a machine (e.g., a server(s) within the server farm) on which only the first build has been installed, installation of the third build may obviate any benefit of installing the second build since the third build is inclusive of all the patches that are included within the second build.

Accordingly, in various embodiments where a particular build is installed on a server farm out-of-sequence, one or more intermediate builds may be identified and prevented from being installed on the server farm. Continuing with the example from the previous paragraph, the second build may aptly be described as an intermediate build with respect to the first build and the third build because the second build is ordered after the first build and prior to the third build. Performing system updates on a machine by installing an individual build of patches results in some incremental demand and/or strain being placed on the inherently limited computing resources of the machine (e.g., server computers are limited in terms of memory and available processing power). In this regard it can be appreciated that installing a build will require the processor(s) of the machine to perform additional processing cycles and a memory of the machine to perform additional read and write operations. Accordingly, preventing intermediate builds from being installed on a server farm will further reduce the demand on the computing resources available to that server farm and, ultimately, may prevent those computing resources from becoming overly strained.

Further reducing the usage of various computing resources, preventing installation of the one or more intermediate builds on the server farm may include refraining from transmitting the one or more intermediate builds to the server farm. Thus, aside from the reduced computing resource demand that results from foregoing an installation process for the intermediate build(s), the individual machine (s) of the server farm are further alleviated from even having to receive the intermediate build(s) via a network interface and/or store the intermediate build(s) in memory and/or a non-volatile storage location. Additionally, refraining from transmitting the intermediate builds to the server farm reduces network traffic and, therefore, frees up additional bandwidth for the server farm to service requests that are received from various client sites in association with supported tenants.

To illustrate the forgoing technical benefits, suppose that the cumulative size of all the patches included within the second build is equal to nine-hundred "900" megabytes (MB) and that an expedited installation of the third build out-of-sequence (e.g., before the second build is transmitted to the server farm) obviates any benefits of installing the second build. Under these circumstances, refraining from transmitting the second build to the server farm will reduce network traffic to the server farm by 900 MB for each machine that resides within the server farm. Thus, if the server farm consists of one-thousand machines (e.g., a modest number of computer servers in comparison to modern server farms), then refraining from transmitting the second build to the server farm may reduce network traffic to the server farm by 900 gigabytes (GB).

It should be appreciated that any reference to "first," "second," etc. items and/or abstract concepts within the description is not intended to—and should not—be construed to necessarily correspond to any reference of "first," "second," etc. elements of the claims. In particular, within this Summary and/or the following Detailed Description, items and/or abstract concepts such as, for example, individual "software" patches and/or builds and/or server farms may be distinguished by numerical designations without such designations corresponding to the claims or even other paragraphs of the Summary and/or Detailed Description. For example, any designation of a "first build" and "second build" within a paragraph of this disclosure is used solely to distinguish two different "builds" within that specific paragraph—not any other paragraph and particularly not the claims.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical to refer to each individual item. Generic references to the items may use the specific reference number without the sequence of letters.

DETAILED DESCRIPTION

The following Detailed Description is directed toward a system for reducing strain on server farm computing resources by over-riding "off-peak" patching schedules when performance failures occur on a server farm. Generally described, embodiments disclosed herein determine a patching schedule for sequentially installing builds of patches during an off-peak usage time-range. Additionally, or alternatively, installation of the builds may occur when an activity level is below a threshold activity level. In this way, any disruption caused during installation of the patches may be minimized. The system described herein may over-ride the "off-peak" patching schedule in response to a performance failure occurring with respect to a functionality of a server application being run at the server farm. For example, the system may respond to the performance failure by identifying a particular patch that is designed to resolve the performance failure and expediting an out-of-sequence installation of a whichever build first includes this particular patch.

In contrast to existing server farm patching systems which rigidly adhere to sequential installations of builds in accordance with an "off-peak" patching schedule, expediting an out-of-sequence installation of whichever build initially includes the particular patch may reduce the impact that the performance failure has on the computing resources of the server farm. To illustrate this point, consider that a common type of performance failure may be a software regression that causes a functionality of a software application to demand increased computing resources (e.g., processor cycles and/or memory) as compared to a previous version of the software application. For example, installation of a particular build may result in an inadvertent software regression that is identified only upon being operational in a live computing environment. Under these circumstances, over-riding the "off-peak" patching schedule to expedite installation of a particular patch that resolves the software regression will reduce the time in which the computing resources are experiencing increased demand due to the software regression. Thus, over-riding the "off-peak" patching schedule to expedite installation of the particular patch will reduce overall utilization of computing resources such as processor cycles, power, and memory to name a few.

Figure 1:
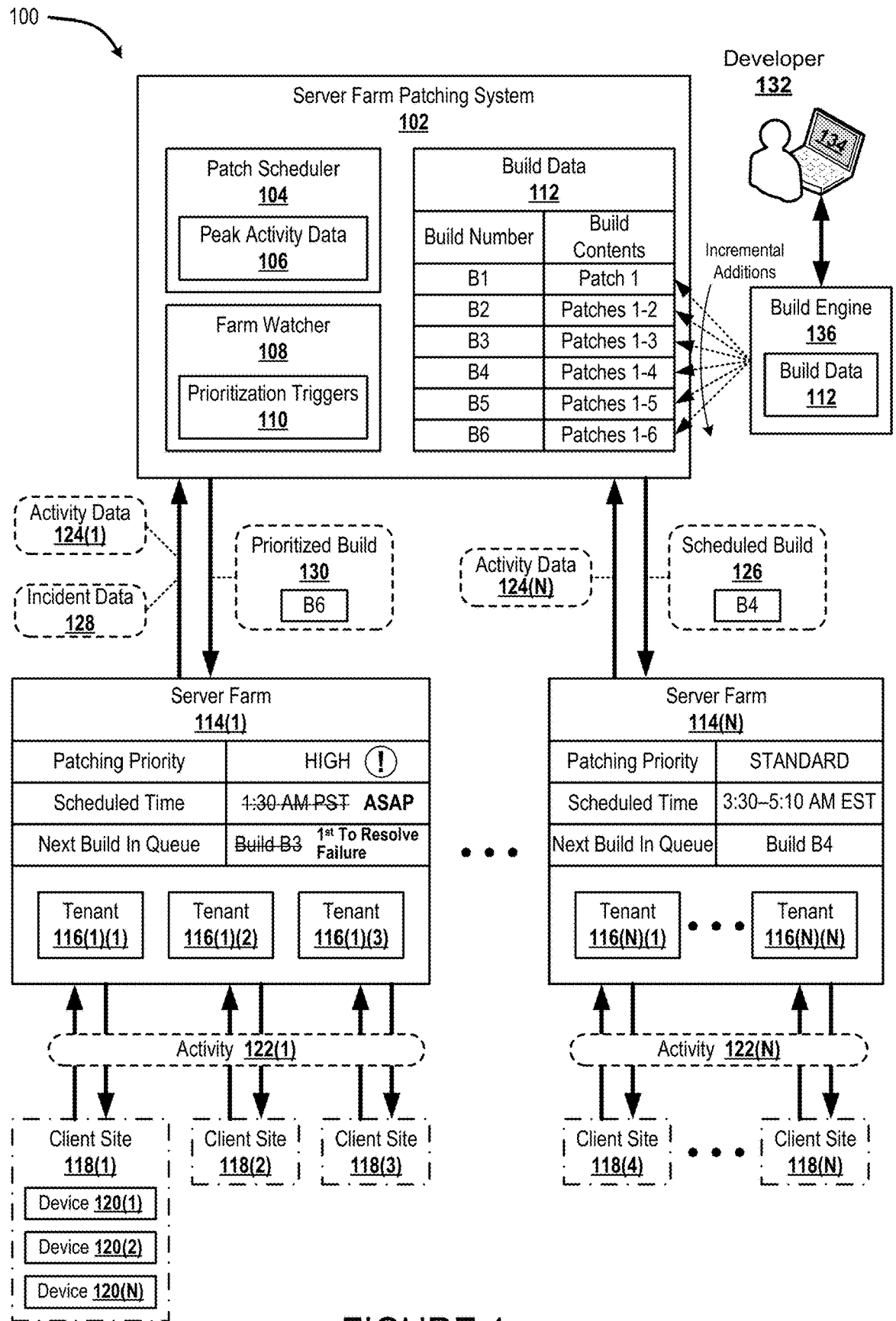
FIG. 1 illustrates is a system for over-riding a patching schedule to reduce the strain that performance failures such as software regressions cause on server farm computing resources.

Turning now to FIG. 1, illustrated is a system 100 for over-riding a patching schedule to reduce the strain on server farm computing resources that is caused by performance failures. An exemplary performance failure may include, but is not limited to, a software regression that impacts the computational efficiency of a functionality of a server application. As illustrated, the system 100 includes a server farm patching system 102 that is configured to distribute software patches (referred to herein as "patches") to server application(s) that are executed by a server farm 114. As used herein, the term "patch" may refer generally to a piece of software code that can be added to a server application to add and/or modify features, resolve security vulnerabilities, fix software "bugs," etc.

In the illustrated example, the system 100 includes a first server farm 114(1) and an $N^{th}$ server farm 114(N). As used herein, the term "server farm" may refer to a collection of computer servers that are interconnected to provide one or more tenants with server functionality that is beyond the capabilities of a single machine. In this example, the first server farm 114(1) is facilitating three tenants 116 that serve three client sites 118 and the $N^{th}$ server farm 114(N) is facilitating N tenants 116 that serve N client sites 118. As used herein, the term "tenant" may refer generally to a logical block of data that is owned and managed by an entity. The entity may be provisioned with access rights for accessing the tenant via one or more devices 120 (e.g., laptop computers, smart phones, etc.) that are being operated at one or more client sites 118. An exemplary client site 118 may be a physical office building that is occupied by an entity and that provides internet connectivity to enable devices 120 to generate activity 122 between the server farms 114 and the client sites 118 or, more specifically, the devices 120.

At the server farm patching system 102, build data 112 may be compiled that arranges the patches in a sequence of builds in which successive builds within the sequence include incremental additions to a set of patches. In the illustrated example, the build data 112 includes six ("6") sequential builds that are individually labeled "B1" through "B6" and which each include an incremental addition of one patch as compared to the immediately previous build in the sequence, if applicable (e.g., no build precedes build "B1"). Specifically, build B1 includes a first patch, build B2 includes the first patch and a second patch, build B3 includes the first and second patches and a third patch, and so on. Stated plainly, each successive build includes all of the patches which were included in the immediately previous build and also one or more additional patches. Thus, installation of a particular build (or more specifically the patches packaged therein) may obviate any benefit of installing other builds that are earlier in the sequence since the particular patch will include all of the patches that are included within the earlier builds.

Installation of a build of patches to a server farm 114 may result in some impact to the performance and/or stability of the machines that are being updated. This impact may be disruptive to users which are utilizing the services provided by the server farm 114 during the install. For example, individual ones of the server farms 114 may facilitate one or more tenants 116 which serve one or more client sites 118. During peak business hours for the tenant(s) 116 of any individual server farm 114, the amount of activity 122 that is occurring between the individual server farm 114 and the client sites 118 may be higher than during an off-peak usage time-range. This is because a number of users that are actively generating service loads is generally greater during peak business hours than during an off-peak usage time-range. Therefore, in general, the installation of builds of patches may be particularly disruptive when applied during peak-business hours of a tenant 116.

Accordingly, the server farm patching system 102 may mitigate the level of disruption by causing the builds of patches to be installed during an off-peak usage time-range for the tenants 116 of a server farm 114. For example, when a new build of patches is ready to be deployed to individual ones of the server farms 114, the server farm patching system 102 may determine which tenants 116 are in an off-peak usage time-range and then limit deployment of the new build to the server farms 114 that are facilitating those tenants 116. Then, as an off-peak usage time-range begins for other tenants 116 that are facilitated by other server farms 114, the server farm patching system 102 may automatically deploy the new build to those other server farms 114 as well. In this way, the server farm patching system 102 may prevent an end user that is operating a device 120 at a client site 118 from having a workflow disrupted due to a build of patches being hastily installed during business hours.

The server farm patching system 102 may include a patch scheduler 104 that is configured to generate patching schedules for the individual server farms 114 based on an off-peak usage time-range for the individual server farms 114. Individual patching schedules may define one or more scheduled times for installation of builds on individual ones of the server farms 114. A scheduled time may be a discrete moment in time or, alternatively, a time-range. For example, as illustrated, the scheduled time for the first server farm 114(1) is the discrete time of 1:30 AM Pacific Standard Time (PST) whereas the scheduled time for the $N^{th}$ server farm 114(N) is the time-range of 3:30 AM Eastern Standard Time (EST) to 5:10 AM EST.

In some embodiments, the patch scheduler 104 may automatically determine the off-peak usage time-range based on peak activity data 106 that indicates how the levels of activity 122 for any particular server farm 114 vary in time. For example, the peak activity data 106 may indicate that first activity 122(1) between the first server farm 114(1) and the corresponding client sites 118 is generally highest between the hours of 7:00 AM to 8:00 PM. The peak activity data 106 may further indicate that outside of these peak business hours the first activity 122(1) is low with a minimum level generally occurring roughly at 1:30 AM PST. Stated alternatively, the patch scheduler 104 may determine an off-peak usage time-range for individual server farm(s) 114 based on peak activity data 106 that indicates patterns of activity 122 corresponding to the individual server farms 114 and/or tenants 116 thereof. Accordingly, under these specific exemplary circumstances, the patch scheduler 104 may set a scheduled time for installation of the builds on the first server farm 114(1) as 1:30 AM PST.

In some embodiments, the patch scheduler 104 may monitor the activity 122 continuously and/or periodically to generate the peak activity data 106. For example, the patch scheduler 104 may monitor the first activity 122(1) between the first server farm 114(1) and corresponding client sites 118 over a period of time (e.g., a day, a week, a month, etc.) to generate a portion of the peak activity data 106 that specifically corresponds to the first server farm 114(1). Then, based on that portion of the peak activity data 106, the patch scheduler 104 may automatically determine the scheduled time for the first server farm 114(1) as described above.

Alternatively, or additionally, to determining the off-peak usage time-range based on peak activity data 106, the patch scheduler 104 may determine the off-peak usage time-range (and therefore the scheduled times for installation) based on which geographic regions correspond to the various tenants served by individual server farms 114. To illustrate this point, suppose that the tenants 116 that are served by the first server farm 114(1) each reside within Washington State of the United States of America and, therefore, each reside within the Pacific Time Zone. Under these circumstances, the patch scheduler 104 may determine the scheduled times for installing the builds on the first server farm 114(1) based on data indicating a general (e.g., non-tenant specific) off-peak usage time-range for Pacific Standard Time (PST).

Additionally, or alternatively, to automatically determining the scheduled times based on the peak activity data 106 and/or geographic regions, the patch scheduler 104 may also receive user input that is designed to designate the scheduled time(s) for individual server farms 114. For example, an administrator that is provisioned with authority over an individual server farm 114 may set the off-peak usage time-range manually (e.g., based on an analysis of a requests-per-second report that indicates when server farm usage is minimal).

The patching schedule for any particular server farm 114 may indicate which build of the sequence of builds is the next build in queue to be installed. For example, as illustrated, the next build in queue for the first server farm 114(1) is build "B3" and the next build in queue for the $N^{th}$ server farm 114(N) is build "B4." Under circumstances where the builds are installed in sequence, the first build will be installed before the second build, the second build will be installed before the third build, and so on.

The server farm patching system 102 may designate a patching priority for the individual server farms 114 that indicates an urgency of causing a subsequent build to be deployed to and installed on the individual server farms 114. The patching priorities may include a standard priority which causes the builds to be sequentially installed on the server farms 114 at their corresponding scheduled time(s). For example, due to the $N^{th}$ server farm 114(N) being designated with a patching priority of "STANDARD," the server farm patching system 102 may wait until 3:30 AM EST and then transmit the build "B4" to the $N^{th}$ server farm 114(N). Then, upon receipt of the build "B4," the $N^{th}$ server farm 114(N) may begin to install the patches included in build "B4" but which have yet to be installed.

In some embodiments, the server farm patching system 102 may receive activity data 124 that indicates current and/or historic characteristics of the activity 122 that occurs between the server farms 114 and the devices 120. For example, the $N^{th}$ activity data 124(N) may inform the server farm patching system 102 about a current level of the $N^{th}$ activity 122(N). To minimize the disruption caused by installing the next build in queue when the patching priority is set to standard, the server farm patching system 102 may compare the current level of the $N^{th}$ activity 122(N) to an activity level threshold to refrain from initiating the installation of the next build in queue unless the current level of activity is below the activity level threshold (e.g., less than X requests per second where X is a positive integer). In this way, if for some reason there is a higher-than-normal level of activity 122 occurring during off-peak hours, the server farm patching service 102 may recognize this deviation from the norm and react appropriately to prevent interference with the "current" activity 122(N).

For purposes of the illustrated example, presume that the $N^{th}$ activity data 124(N) indicates that the current level of the Nth activity 122(N) is below the activity level threshold. Accordingly, upon the time reaching the scheduled time (e.g., 3:30 AM EST for the $N^{th}$ server farm 114(N)), the server farm patching system 102 may determine whether the current level of activity is below the activity level threshold. In response to the current level of the $N^{th}$ activity 122(N) being under the activity level threshold, the server farm patching system 102 transmits a scheduled build 126 that includes the next build in queue (e.g., build "B4" for the $N^{th}$ server farm 114(N)) for any particular server farm 114. If in contrast the current level of the $N^{th}$ activity 122(N) were above the activity level threshold, the server farm patching system 102 would refrain from transmitting the scheduled build 126—or otherwise initiating the installation of the next build in queue.

Under a variety of circumstances, performance failures may occur as the server farm(s) implement, or attempt to implement, particular functionalities of a server application (e.g., a SaaS email application). As a specific but non-limiting example, the server farm(s) may be configured to implement an email functionality to enable large files (e.g., files over 25 MB) to be shared via a link embedded in an email rather than attaching the large file to the email itself. Continuing with this specific example, during peak business hours when the server farm(s) 114 are experiencing a high level of activity 122, this particular email functionality may begin to experience performance failures such as, for example, one or more of the embedded links failing to provide access to the corresponding large files. Such performance failures may be caused by a variety of computing events such as, for example, malware software code being inadvertently received at the server farm(s) and/or a software regression resulting from a build of patches being installed on the server farm(s).

Responsive to experiencing a performance failure, the individual server farms 114(1) may generate incident data 128 indicating that the performance failure has occurred. The incident data 128 may also indicate various characteristics of the performance failure. Exemplary characteristics include, but are not limited to, a feature identifier (ID) to identify which specific feature of the software being run by the server farm(s) 114 has failed, diagnostics data that is usable by developers to resolve the performance failure, and any other characteristic suitable for inclusion in the incident data 128. As illustrated, the individual server farm(s) 114 may transmit the incident data 128 to the server farm patching system 102 to inform the server farm patching system 102 and/or one or more developers 132 when performance failures occur. In some embodiments, the incident data 128 may be transmitted to the server farm patching system 102 in near real-time to enable one or more developers 132 to resolve the issue as soon as possible.

The server farm patching system 102 may alter the patching priority for an individual server farm 114 based on the occurrence of the performance failure as indicated within the incident data 128. In the illustrated example, the server farm patching system 102 receives incident data 128 from the first server farm 114(1) and, based thereon, changes the patching priority for the first server farm 114(1) from "STANDARD" to "HIGH." As further illustrated, the change in the patching priority to "HIGH" may cause the patching schedule that has been determined for the first server farm 114(1) to be over-ridden (e.g., as indicated by the strike-thru text).

Over-riding the patching schedule may include over-riding the next build in queue to cause an out-of-sequence installation of whichever build is the first build to include a particular patch that is designed to resolve the performance failure. For example, responsive to receiving the incident data 128, the server farm patching system 102 may analyze characteristics of the performance failure against the build data 112 to identify a particular patch this is designed to resolve the performance failure. Continuing with the above example in which the performance failure is associated with the email functionality for providing access to large files via links that are embedded within emails, the particular patch may be designed to resolve a software regression that caused the embedded links to stop functioning properly.

Figure 2:
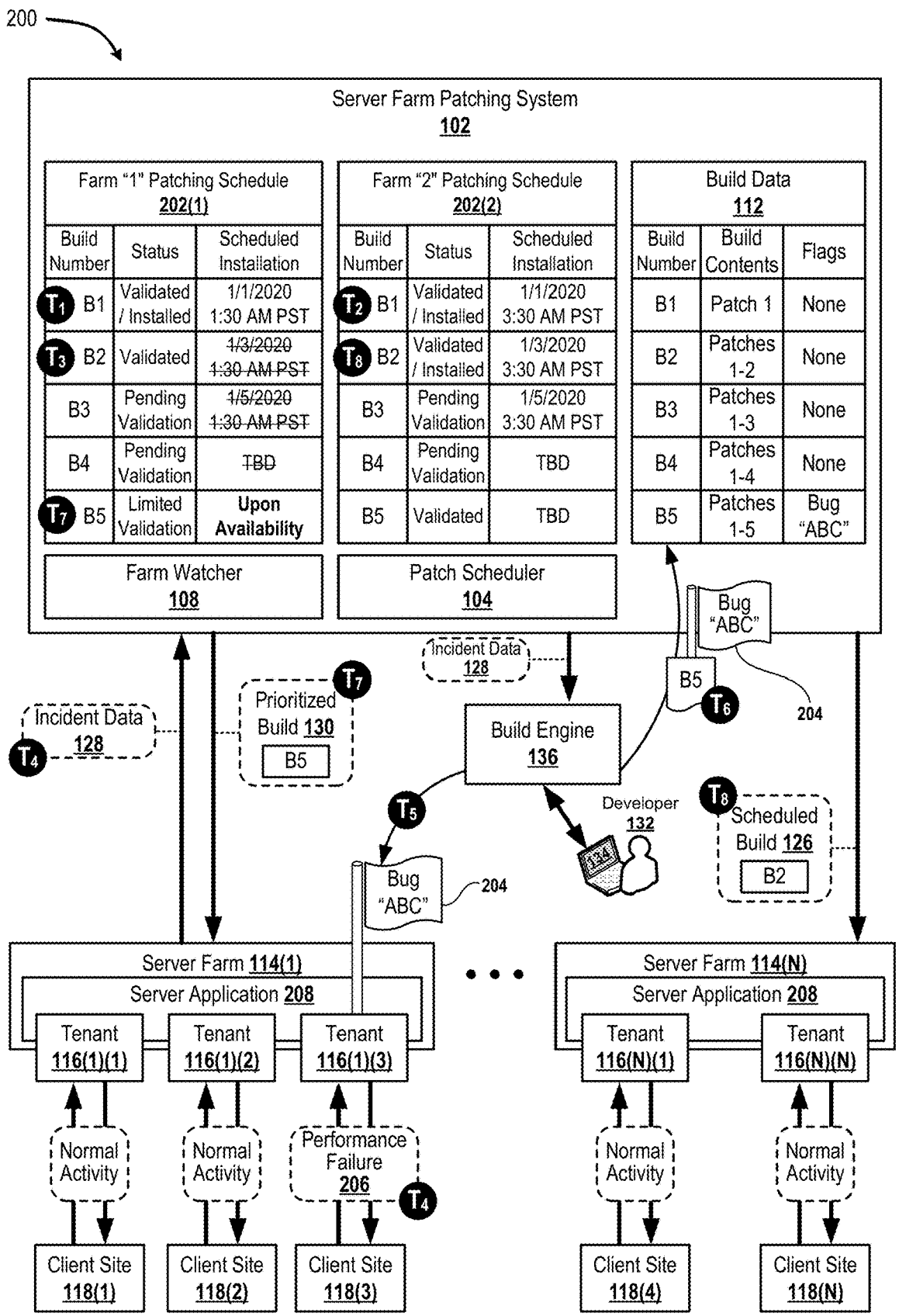
FIG. 2 illustrates a system for enabling a build engine to associate a flag with an individual tenant of a server farm to override a scheduled build by causing a prioritized build to be transmitted to the server farm in place of the scheduled build.

As described in more detail with respect to FIG. 2, the particular patch may also include some information (such as a flag 204) that is usable by the server farm patching service 102 to identify a correspondence between the particular patch and the performance failure (e.g., which server farms 114 and/or tenants have experienced the performance failure). For example, the server farm patching system 102 may include a farm watcher 108 that is specifically configured to monitor conditions associated with the server farms 114 and to prioritize the respective patching schedules for the individual server farms 114 based on the observed conditions. The farm watcher 108 may be configured to compare the observed conditions to one or more prioritization triggers 110 which may be predefined conditions which result in the patching schedule for any individual server farm to be overridden. An exemplary prioritization trigger 110 may include, but is not limited to, an individual server farm 114 being associated with a flag as described in more detail in relation to FIG. 2.

In the example illustrated in FIG. 1, build "B6" is the first build within the sequence of builds to include the particular patch that is designed to resolve the performance failure reported in the incident data 128. Accordingly, rather than transmitting a scheduled build 126 that includes build "B3" to the first server farm 114(1), the server farm patching system 102 transmits a prioritized build 130 that includes whichever build is first capable of resolving the performance failure.

Additionally, or alternatively, over-riding the patching schedule may include over-riding the scheduled time for the next build installation. For example, responsive to receiving the incident data 128, the server farm patching system 102 may expedite an installation of a build that is capable of resolving the performance failure. This may include initiating an installation as soon as possible (ASAP) such as, for example, substantially immediately upon the developer 132 using a build engine 136 to add the particular patch that is designed to resolve the issue into the build data 112. As a specific but non-limiting example, the incident data 128 may report a performance failure during peak business hours and prior to a patch having been developed to resolve the performance failure. Under these specific circumstances, the developer 132 may deploy a computing device 134 for accessing a build engine 136 to analyze the incident data 128. Then, based on the analysis, the developer 132 may design a patch to resolve the performance failure and add the patch as an incremental addition to a "latest" build (e.g., build "B6" within the present example) within a sequence of builds.

It can be appreciated therefore that the prioritized build 130 may include the "latest" build in the sequence due to this "latest" build being the first build capable of resolving the performance failure. It can further be appreciated that in implementations where the patch for resolving the performance failure is developed only after the incident data 128 is received (e.g., the patch development is in reaction to the performance failure), the prioritized build 130 may be transmitted to a server farm 114 that is affected by the performance failure substantially immediately upon the newly developed patch being added to the "latest" build. This may be the case even if the patch is added during peak business hours when build installations do not occur in accordance with "STANDARD" patching priority.

In some implementations, the server farm patching system 102 may be configured to determine whether to over-ride the scheduled time based on an estimated relative impact of expediting a build installation to resolve the performance failure versus initiating the build installation at the next scheduled time. Then, if the estimated relative impact indicates that over-riding the patching schedule to expedite resolution of the performance issue will cause less overall disruption to end users than waiting until the next scheduled time, the prioritized build 130 may be sent out in advance of the next scheduled time.

To determine the estimated relative impact, the server farm patching system 102 may analyze the incident data 128 to determine a first estimated impact that the performance failure is likely to cause if resolved at the next scheduled time per the predetermined patching schedule. For example, the incident data 128 may indicate a frequency of the performance failure and a severity of the performance failure. Then, the server farm patching system 102 may determine the first estimated impact based on the frequency and/or severity of the performance failure and also a time span between a current time and the scheduled time. For example, if there is eight hours remaining until the scheduled time, the first estimated impact may be determined by multiplying the frequency (e.g., in occurrences of the performance failure per hour) times the severity (e.g., the disruption caused by a single performance failure) times the eight-hour time span until the "next" scheduled time.

Also, in order to determine the estimated relative impact, the server farm patching system 102 may analyze the build data 112 to determine a second estimated impact that is likely to result from causing the "affected" server farms 114 (i.e., those server farms 114 that have experienced and/or are experiencing the performance failure) to be updated prior to the "next" scheduled time. As described above, for example, causing patches to be installed may result in some negative impact to the performance or stability of the machines being updated. This issue is the underlying reason why the patching schedule is determined to cause system updates (e.g., build installations) to occur outside of peak business hours. In some implementations, the server farm patching system 102 may analyze relevant information such as, for example, the build data 112 to identify a complexity of the build that will resolve the performance failure and previous update times which were required to install other builds of similar complexity.

Based on analyzing the relevant information, the server farm patching system 102 may determine the second estimated impact. For example, the relevant information may indicate that the build installation may cause only 15 minutes of system downtime during which the "affected" server farm 114 will be unable to service requests from the client sites 118. The relevant information may further indicate that the level of activity 122 at the current time is relatively low as compared to other times within peak business hours. For example, the patch to resolve the performance failure may become available shortly after the incident data 128 is received very early in the morning before many employees have begun to work. For example, the first performance failure may occur at 7:00 AM PST and the developer 132 may add the patch to the build data 112 at 7:30 AM PST when few users are generating any activity 122 between their device(s) 120 and the affected server farm 114.

Under this specific but non-limiting example, the second estimated impact indicates that the performance failure can be resolved prior to the activity 122 reaching peak levels for the day and the first estimated impact indicates that waiting to resolve the issue will cause high levels of disruption during the upcoming work day. Accordingly, in this example, the estimated relative impact indicates that expediting the build installation to resolve the performance failure as soon as possible will be less disruptive to end users than waiting until the scheduled time to initiate the build installation. Therefore, responsive to the estimated relative impact, the server farm patching system 102 over-rides the patching schedule and expedites generation and transmission of the prioritized build 130 to the affected server farm 114.

Turning now to FIG. 2, illustrated is a system 200 for enabling a build engine 136 to be used for associating a flag 204 with an individual server farm 114 (and/or tenants 116 thereof) to override a scheduled build. In this example, over-riding the scheduled build includes causing a prioritized build 130 to be transmitted to the individual server farm 114 rather than the scheduled build 126. It is worth noting that in FIG. 2, the scheduled build that is over-ridden is associated with the first server farm 114(1) and is not illustrated whereas another scheduled build associated with the $N^{th}$ server farm 114(N) is not over-ridden and is illustrated.

To illustrate aspects of the techniques disclosed herein, FIG. 2 illustrates an exemplary data flow scenario in which various operations and/or functionalities occur in a specific order. More specifically, FIG. 2 describes various operations and/or functionalities occurring at eight sequential times that are individually labeled $T_1$ through $T_8$. However, the order in which these operations and/or functionalities are described and/or illustrated herein is not intended to be construed as a limitation. Rather, any number of the operations and/or functionalities described with respect to FIG. 2 may be combined in any order and/or in parallel in accordance with the present disclosure. Other processes and/or operations and/or functionalities described throughout this disclosure shall be interpreted accordingly.

At time $T_1$, a build "B1" is installed on a first server farm 114(1) in accordance with a scheduled build (not shown being transmitted in FIG. 2) of a Farm "1" patching schedule 202(1). In some implementations, the patching schedules 202 may indicate one or both of a scheduled date and/or a scheduled time for installing a particular build of patches onto a particular server farm 114. In the illustrated example, the Farm "1" patching schedule 202(1) defines a scheduled installation time for the build "B1" as 1:30 AM PST on Jan. 1, 2020. Therefore, in the exemplary data flow scenario of FIG. 2, time $T_1$ corresponds to this date and time.

At time $T_2$, the build "B1" is installed on a second server farm 114(2) in accordance with another scheduled build (also not shown being transmitted in FIG. 2) of a Farm "2" patching schedule 202(2). In the illustrated example, $T_2$ occurs two hours after $T_1$ so that during peak business hours on Jan. 1, 2020 (e.g., 7 AM to 8 PM and/or any other time-range) both of the first server farm 114(1) and the second server farm 114(2) have completed respective installations of the build "B1" and operate based on any code modifications that result from one or more patches included in the build "B1."

As described above, in various implementations, when a particular build is designated to be installed across a plurality of server farms in accordance with a "STANDARD" patching priority, the server farm patching system 102 may wait until an off-peak usage time-range for the individual server farms 114. Then, during the off-peak usage time-range, the server farm patching system 102 may determine whether a current level of activity 122 is less than a threshold activity level. In this way, for an individual server farm, if the current level of activity 122 falls below the threshold activity level during the off-peak usage time-range then the next build in queue may be installed. In contrast, if the current level of activity 122 does not fall below the threshold activity level during the off-peak usage time-range the server farm patching system 102 refrains from installing the next build in queue.

It can be appreciated, therefore, that for builds that are installed according to a "STANDARD" patching priority, one or more off-peak usage time-ranges may come and go before the builds are installed on substantially all of the individual server farms. For example, upon a particular build being released for installation, it may take forty-eight ("48") hours or more to achieve ninety to ninety-five percent ("90-95%") installation coverage across a plurality of server farms.

At time $T_3$, a build "B2" that is scheduled to be installed on the first server farm 114(1) at 1:30 AM on Jan. 3, 2020 is marked as validated on the server farm patching service 102. For example, at some time prior to $T_2$, a developer 132 may utilize the build engine 136 to add a second patch to the build data 112. The second patch may be a standard priority patch that is designed to add functionality to a server application or to modify the server application code in any other manner for which it is suitable to wait until off-peak hours to install (e.g., installation of the standard priority patch may be low in urgency). Under circumstances where the builds are transmitted and/or installed according a "STANDARD" patching priority, the builds will be installed on the server farms 114 in accordance with the patching schedules 202 (e.g., in sequence and/or during an off-peak usage time-range).

At time $T_4$, the first server farm 114(1) may experience a performance failure 206 and respond by transmitting incident data 128 to the server farm patching service 102. Based on the receipt of the incident data 128, the server farm patching system 102 may over-ride one or more scheduled builds within the Farm "1" patching schedule 202(1). For example, the server farm patching system 102 may respond to the incident data 128 by cancelling the scheduled installations for one or more intermediate builds. As used herein, the term "intermediate build" may refer generally to a build that is ordered within the sequence of builds after whichever build was last installed on a server farm 114 and prior to another build which is the first build to include a patch designed to resolve the performance failure 206. For purposes of the present discussion, the build "B5" is the first build within the sequence of builds to include a patch that is designed to resolve the performance failure 206. Therefore, the builds "B2" through "B4" are aptly described as intermediate builds in the exemplary data flow scenario of FIG. 2.

For purposes of the exemplary data flow scenario of FIG. 2, presume that the performance failure 206 corresponds to a software "bug" that has caused a regression in the behavior of a server application 208 being run at both of the first server farm 114(1) and the second server farm 114(2). Further suppose that at time $T_4$ when the performance failure 206 occurs and/or is reported to the server farm patching system 102, a patch has not yet been designed to resolve the performance failure 206. Accordingly, in anticipation of a patch becoming available and added to a "latest" build, the server farm patching system 102 may schedule a particular build to be transmitted as a prioritized build 130 as soon as it becomes available. For example, as illustrated, the build "B5" has been scheduled for installation "Upon Availability" so that as soon as the patch for resolving the performance failure is available its build is sent out.

Subsequent to time $T_4$, the developer 132 may begin utilizing the build engine 136 to develop a patch that resolves the performance failure 206. For purposes of the present discussion, the developer 132 generates patch "5" to resolve the performance failure 206 and adds patch "5" to the builds to generate build "B5."

At time $T_5$, an association is generated between the flag 204 and the specific tenant 116(1)(3) which experienced the performance failure 206. As illustrated, for example, the flag 204 is graphically shown as being placed on the tenant 116(1)(3). In some implementations, the developer 132 may interact with the build engine 136 to manually associate the flag 204 with the tenant 116(1)(3). In some implementations, the farm watcher 108 responds to the flag 204 being placed on the tenant 116(1)(3) by increasing the patching priority of the tenant 116(1)(3) and or first server farm 114(1) from a "STANDARD" patching priority to a "HIGH" patching priority.

Server farm computing architectures can be designed in a variety of ways and, in some instances, installation of any particular build on a server farm 114 is agnostic to the individual tenants 116 that are facilitated by that server farm 114. That is, the builds of patches may be installed at the server farm level such that all of the tenants 116 that are facilitated by a particular server farm 114 receive the benefits (and/or drawbacks in the event a bug and/or software regression) that result from any particular build. Therefore, in some implementations, even if only a single tenant 116 on a particular server farm 114 is experiencing a performance failure 206, the particular server farm 114 may be tagged as a whole rather than merely tagging the single tenant 116.

At time $T_6$, the developer 132 causes the build "B5" to be transmitted from the build engine 136 to the server farm patching system 102 for addition to the build data 112. As illustrated, the flag 204 may also associated with the particular patch that is designed to resolve the performance issue 206 and/or the build "B5" due to it being the first to include the particular patch.

At time $T_7$, the build "B5" is designated with a status of that permits the deployment of the build "B5" in the prioritized build 130 to the specific tenant 116(1)(3) that is experiencing the performance failure 206. As illustrated, the status of the build "B5" has been set at $T_7$ to a particular level (e.g., "Limited Validation") which permits the build to be deployed to individual server farms 114 that have been associated with the flag 204 and/or that facilitate tenants 116 that have been associated with the flag 204. For example, the developer 132 may assign the limited validation status to the build "B5" to cause this build to be deployed to server farms 114 where performance failures 206 are known to exist but to prevent the build from being deployed to other server farms 114 that appear to be functioning as expected. In some implementations, the ability to designate a status of a particular build may be protected by multi-factor authentication. For example, in order to designate a particular status as "Limited Validation," the developer 132 may be required to enter multiple different credentials and/or the developer 132 may be required to enter a single set of credentials and then have another developer (not shown) enter a second set of credentials.

In some implementations, the farm watcher 108 is configured to monitor the individual server farms 114 to determine when the flag 204 becomes associated with individual server farms 114. For example, in the example data flow scenario of FIG. 2, the farm watcher 108 determines when the flag 204 that corresponds to the software bug "ABC" is placed on the specific tenant 116(1)(3) that is experiencing the performance failure 206. Then, the farm watcher 108 monitors the build data 112 and/or the patching schedules 202 to determine when the particular patch that designed to resolve the performance failure 206 becomes available and respond by automatically deploying the prioritized build 130. In this way, the prioritized build 130 may be deployed substantially immediately upon the particular patch becoming available for deployment. Once the prioritized build 130 is installed on the server farm(s) 114 that are affected by the performance failure 206, the server farm patching system 102 may change the patching priority back from "high" patching priority to the "standard" patching priority. For example, the flag 204 may be removed from and/or unassociated with the first server farm 114(1).

By facilitating the flag 204 to be commonly associated with a specific tenant 116(1)(3) that is experiencing the performance failure 206 and also a particular patch that is designed to resolve the performance failure 206, the techniques described herein enable the particular patch to be expeditiously deployed at a "HIGH" patching priority level with precise granularity. For example, the techniques described herein enable deployment of the particular patch to be expedited (e.g., sent out with "HIGH" patching priority) with respect to only those server farms 114 that facilitate tenants 116 that are experiencing the performance failure 206. Then, the particular patch may be deployed at a "STANDARD" patching priority to those server farms 114 which do not facilitate tenants 116 which are experiencing the performance failure 206.

Figure 3:
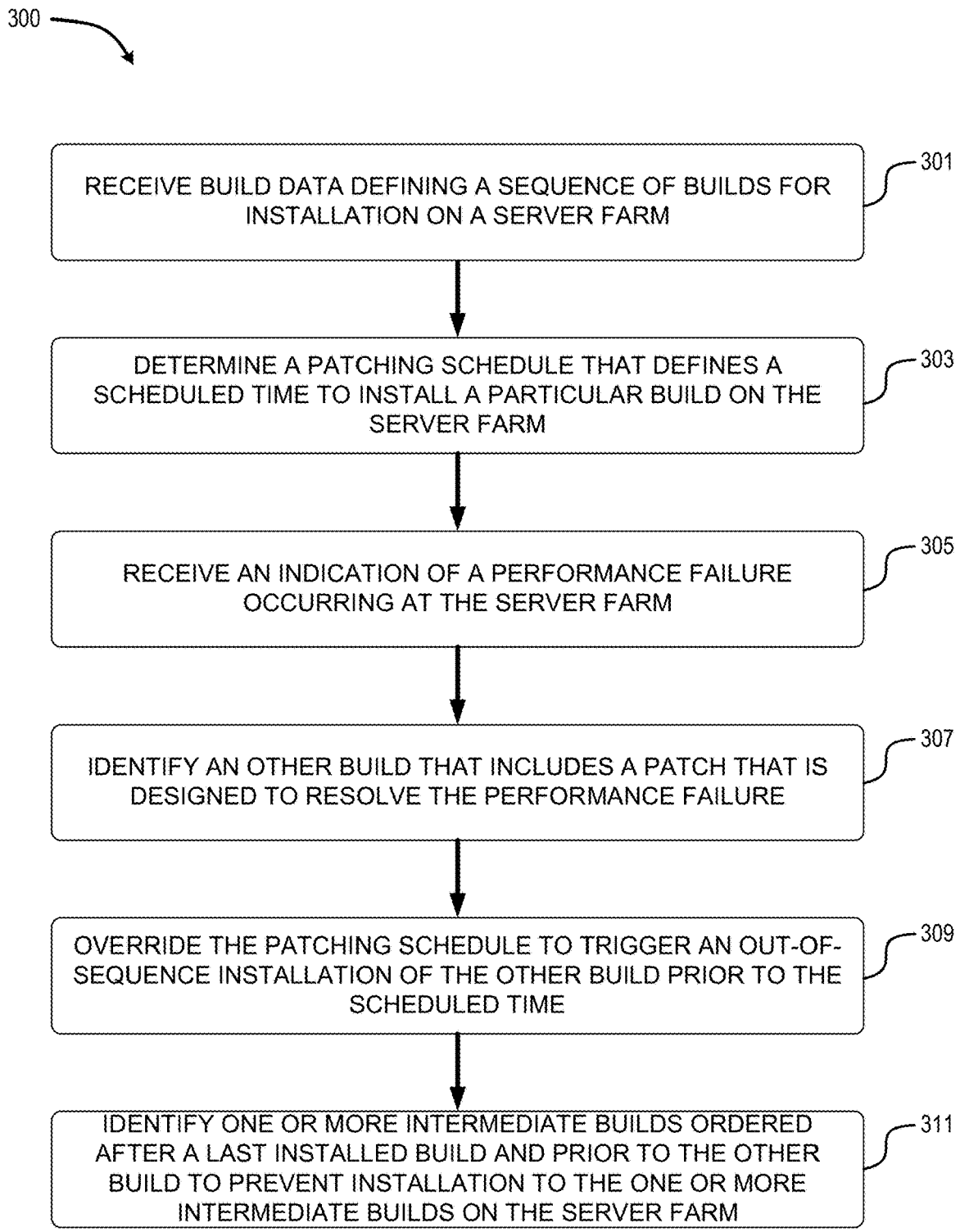
FIG. 3 illustrates a flow diagram of an example method for reducing network traffic and processing cycles at a server farm by preventing installation of intermediate builds onto the server farm when a patching schedule is overridden to cause an out-of-sequence build installation.
Figure 4:
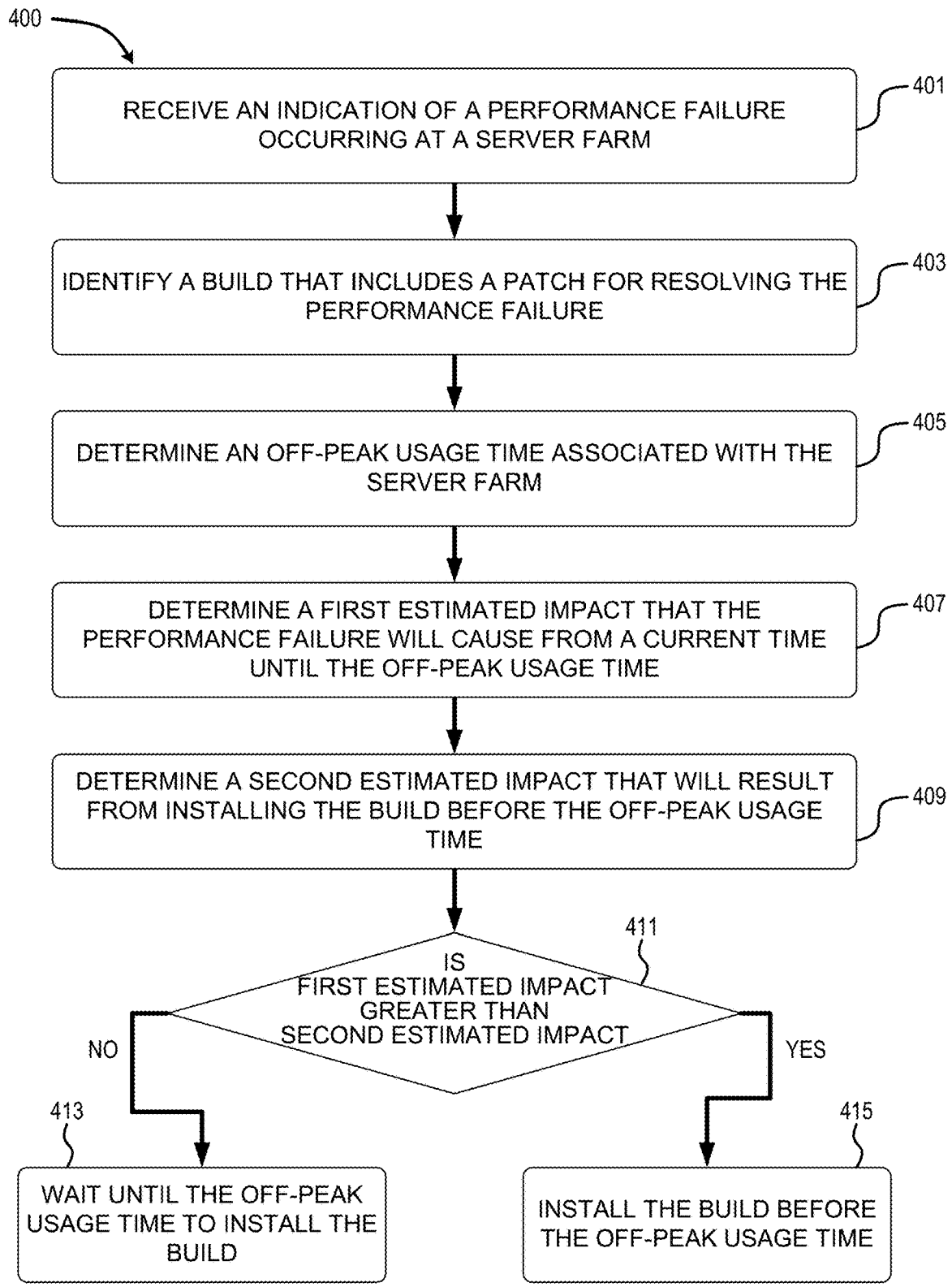
FIG. 4 illustrates a flow diagram of an example method for minimizing an impact of resolving a performance failure at a server farm by determine whether to resolve the performance failure before an off-peak usage time or, alternatively, to wait to resolve the performance failure at the off-peak usage time.

FIGS. 3 and 4 illustrate example flow diagrams. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-executable instructions included on a computer-storage media, as defined herein. The term "computer-executable instructions," and variants thereof, as used in the description and claims, is used expansively herein to include routines, applications, application modules, program modules, programs, components, data structures, algorithms, and the like. Computer-executable instructions can be implemented on various system configurations, including single-processor or multiprocessor systems, minicomputers, mainframe computers, personal computers, hand-held computing devices, microprocessor-based, programmable consumer electronics, combinations thereof, and the like.

Turning now to FIG. 3, illustrated is a flow diagram of an example method 300 for reducing network traffic and processing cycles at a server farm by preventing installation of intermediate builds onto the server farm when a patching schedule is overridden to cause an out-of-sequence build installation. For example, as described above, an out-of-sequence build installation of that resolves a performance failure may also obviate one or more benefits of installing intermediate builds onto a server farm. According to the techniques described herein, installation of such intermediate builds may be prevented in order to conserve computing resources.

At block 301, a server farm patching system 102 may receive build data 112 that defines a sequence of builds that are designed for sequential installation on a server farm 114. Individual builds within the sequence of builds may be generated via a build engine 136 to include incremental additions as compared to previous builds within the sequence of builds. For example, as issues are discovered with code of a server application and/or as it becomes desirable to add/modify features of the server application, a developer 132 may design corresponding patches. Then, the developer 132 may add these patches to a "latest" build to generate a new build—which upon being generated becomes the "latest" build.

At block 303, the server farm patching system 102 may determine a patching schedule that defines a scheduled time to install a "particular" build on the server farm. The "particular" build may be the next build in the sequence after a last installed build. For example, if the last installed build was a build "B1," then the "particular" build may be build "B2"—assuming the builds are ordered "B1," and then "B2," and then "B3," and so on.

At block 305, the server farm patching system 102 may receive an indication of a performance failure 206 occurring at the server farm 114. For example, during the last off-peak usage time-range which occurred prior to the performance failure 206 occurring, the server farm patching system 102 may cause a build to be installed on the server farm 114. Unfortunately, this build may include a patch that is inadvertently flawed and causes a software regression to occur with respect to some aspect of a server application being run by the server farm 114. Moreover, this software regression may cause the aspect of the server application to fail altogether or, at best, continue to operate while demanding increased computing resources such as memory and/or processor cycles.

At block 307, the server farm patching system 102 may identify an "other" build that includes a patch that is designed to resolve the performance failure 206. In various instances, the patch may be non-existent at the time the indication of the performance failure is initially received. For example, as software regressions may remain unbeknownst to the responsible developer(s) until they are experienced by end users, the development of a patches to resolve such software regressions may be a reactionary exercise.

At block 309, the server farm patching system 102 may override the patching schedule that was previously determined at block 303 in order to trigger an out-of-sequence installation of the "other" build that includes the patch for resolving the performance failure 206. In various instances, the "other" build may be installed prior to the scheduled time that was previously set for the "particular" build. For example, despite the scheduled time being set within an off-peak usage time-range, the "other" build may be installed prior to the end of the peak business hours during which the performance failure 206 occurred.

At block 311, the server farm patching system 102 may identify one or more intermediate builds that are ordered subsequent to a last installed build and prior to the "other" build that resolves the performance failure 206. Then, the server farm patching system 102 may prevent the one or more intermediate builds from being installed on and/or even transmitted to the server farm 114. In this way, the processing cycles that would inherently result from transmitting the intermediate builds, writing the intermediate builds to the memory of the server farm 114, and/or executing an installation of the intermediate builds at the server farm 114 can be avoided, in whole or in part.

Turning now to FIG. 4, illustrated is a flow diagram of an example method 400 for minimizing an impact of resolving a performance failure 206 at a server farm 114. Stated plainly, if resolving the performance failure before an off-peak usage time would cause less overall disruption to end users than waiting until the off-peak usage time, then the resolution can be expedited notwithstanding the disruption caused by a system update process.

At block 401, the server farm patching system 102 may receive an indication of a performance failure 206 occurring at a server farm 114.

At block 403, the server farm patching system 102 may identify a build that includes a patch for resolving the performance failure 206. For example, as described with respect to FIG. 2, a flag 204 may be used to indicate which patch and/or build is designed to resolve a performance failure 206 that a particular server farm 114 and/or tenant 116 thereof has been affected by.

At block 405, the server farm patching system 102 may determine an off-peak usage time associated with the server farm. For example, as described with relation to FIGS. 1 and 2, the server farm patching system 102 may analyze activity data 124 to determine when activity 122 between the server farm 114 and the client sites 118 is at a relatively low level (e.g., as compared to peak-hours).

At block 407, the server farm patching system 102 may determine a first estimated impact that the performance failure will cause if allowed to continue from the current time until the off-peak usage time. For example, if the current time is early in the morning and the off-peak usage time is several hours away, then the first estimated impact will be greater than if the current time is late in the evening and the off-peak usage time is only minutes away. Furthermore, if the frequency with which the activity 122 results in the performance failure is great, then the first estimated impact will be greater than if the activity rarely triggers the performance failure. For example, if the performance failure corresponds to some rarely invoked and obscure feature becoming non-functional, the first estimated impact may be less than if the performance failure corresponds to a feature that is frequently used to perform core job functionalities (e.g., email).

At block 409, the server farm patching system 102 may determine a second estimated impact that will likely result from installing the build that resolves the performance failure before the off-peak usage time (e.g., immediately and/or at some other time during peak business hours). For example, the server farm patching system 102 may estimate that an installation of the build may take 15 minutes and be completed prior to the levels of activity 122 ramping up for the day (e.g., it may be the very beginning of a work day when few employees have arrived to work).

At block 411, the server farm patching system 102 may determine an estimated relative impact by determining whether the first estimated impact is greater than the second estimated impact. Stated alternatively, the server farm patching system 102 determines whether it would be more disruptive to fix the performance failure before the off-peak usage time or, alternatively, to wait.

Then, if the first estimated impact is less than the second estimated impact, the method 400 may proceed to block 413 at which the build is installed only once the present time reaches the off-peak usage time.

Alternatively, if the first estimated impact is greater than the second estimated impact, the method 400 may proceed to block 415 at which the build is installed prior to the off-peak usage time.

Figure 5:
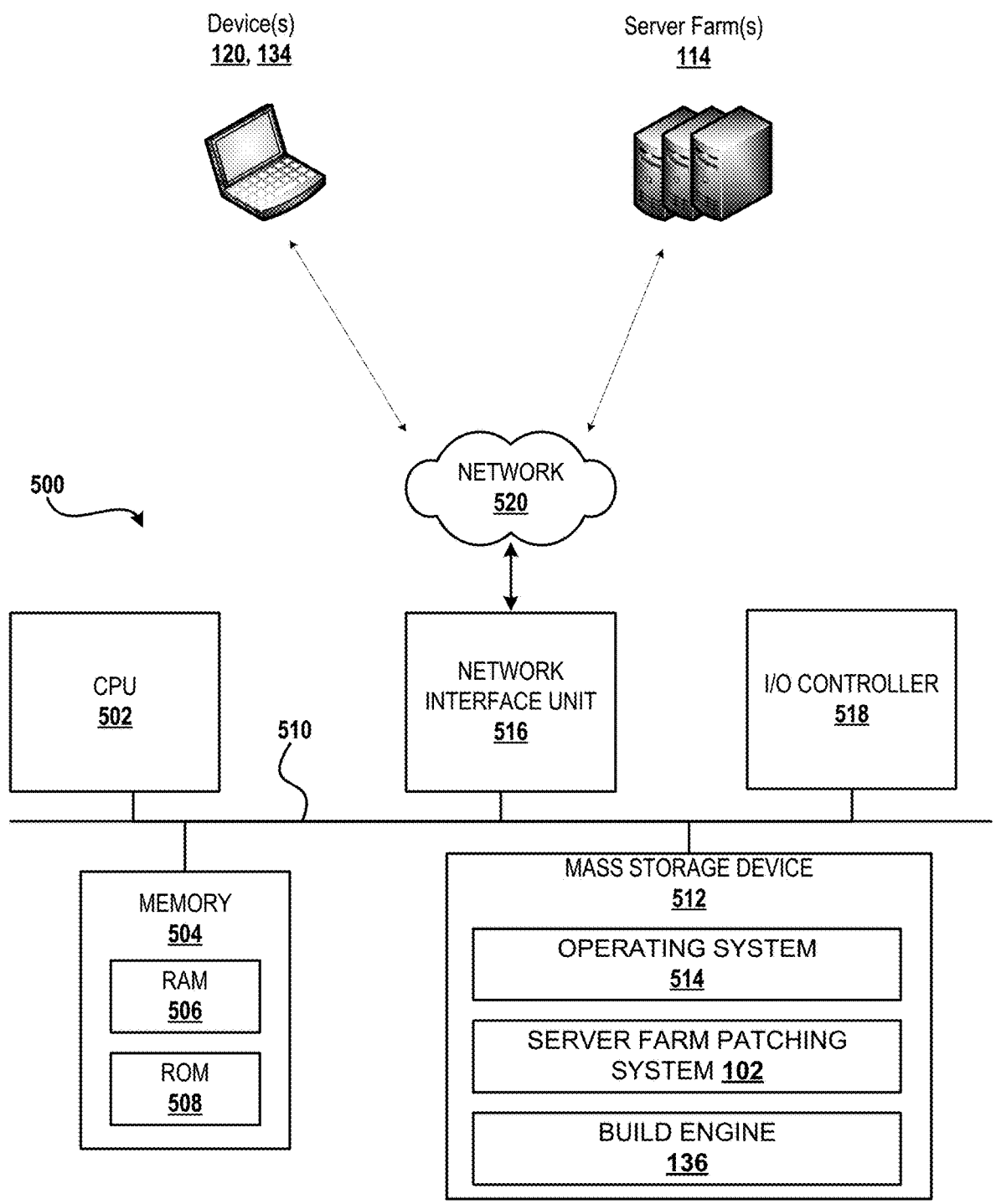
FIG. 5 shows additional details of an example computer architecture for a computer capable of executing the techniques disclosed herein.

FIG. 5 shows additional details of an example computer architecture for a computer capable of executing the techniques disclosed herein. Thus, the computer architecture 500 illustrated in FIG. 5 illustrates an architecture for a client device, a server computer, or network of server computers, or any other types of computing devices suitable for implementing the functionality described herein. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 514, other data, and one or more application programs. The mass storage device 512 may further include one or more of the server farm patching system 102 and/or the build engine 136.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various techniques, the computer architecture 500 may operate in a networked environment using logical connections to remote computers through a network 520 and/or another network (not shown). The computer architecture 500 may connect to the network 520 through a network interface unit 516 connected to the bus 510. It should be appreciated that the network interface unit 516 also may be utilized to connect to other types of networks and remote computer systems. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5). It should also be appreciated that via a connection to the network 520 through a network interface unit 516, the computing architecture may enable the server farm patching system 102 and/or the build engine 136 to communicate with one or more of the device(s) 120, device(s) 134, and/or the server farms 114.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Example Clauses

The disclosure presented herein may be considered in view of the following clauses.

Example Clause A, a server farm patching system, comprising: one or more processors; a memory in communication with the one or more processors, the memory having computer-readable instructions stored thereupon which, when executed by the one or more processors, cause the one or more processors to: receive build data defining a sequence of builds that facilitate installation of a plurality of patches on a server farm; determine a patching schedule that defines a scheduled time for installation of a second build of the sequence of builds on the server farm, wherein the second build is successive in the sequence of builds to a first build that has been installed on the server farm; subsequent to determining the patching schedule, receive incident data indicating a performance failure associated with implementation of a particular functionality by the server farm; based on a flag that a developer has associated with a particular patch that is designed to resolve the performance failure, identify a third build that is subsequent to the second build in the sequence of builds, wherein the particular patch is initially included within the third build; and trigger installation of the third build on the server farm prior to the scheduled time for installation of the second build.

Example Clause B, the server farm patching system of Example Clause A, wherein the computer-readable instructions further cause the one or more processors to: identify one or more intermediate builds that are ordered after the first build and prior to the third build within the sequence of builds, wherein the one or more intermediate builds includes at least the second build; and prevent installation of the one or more intermediate builds on the server farm.

Example Clause C, the server farm patching system of Example Clause B, wherein the one or more intermediate builds includes a first set of the plurality of patches, and wherein the third build is inclusive of the particular patch and the first set of the plurality of patches.

Example Clause D, the server farm patching system of Example Clause B, wherein preventing installation of the one or more intermediate builds on the server farm includes preventing transmission of the one or more intermediate builds to the server farm over one or more networks.

Example Clause E, the server farm patching system of any one of Example Clauses A through D, wherein the performance failure corresponds to a software regression of the particular functionality that results from the first build having been installed on the server farm.

Example Clause F, the server farm patching system of any one of Example Clauses A through E, wherein the computer-readable instructions further cause the one or more processors to: determine an off-peak usage time-range for the server farm based on at least one of: a geographic region associated with one or more tenants that are served by the server farm, or peak activity data that indicates one or more patterns of activity corresponding to the one or more tenants; wherein the scheduled time for installation of the second build is within the off-peak usage time-range, and wherein the installation of the third build is triggered outside of the off-peak usage time-range.

Example Clause G, the server farm patching system of any one of Example Clauses A through F, wherein the computer-readable instructions are executable by the one or more processors to: monitor an activity level between one or more tenants of the server farm and one or more client sites to trigger installation of individual builds during an off-peak usage time-range when the activity level is below a threshold activity level, wherein, in response to receiving the incident data, the installation of the third build is further triggered when the activity level is above the threshold activity level.

Example Clause H, the server farm patching system of any one of Example Clauses A through G, wherein the computer-readable instructions further cause the one or more processors to determine an estimated relative impact of over-riding the patching schedule to resolve the performance failure prior to the scheduled time, wherein the installation of the third build on the server farm prior to the scheduled time is triggered based at least in part on the estimated relative impact.

Example Clause I, the server farm patching system of any one of Example Clauses A through H, wherein successive builds within the sequence of builds include incremental additions to the plurality of patches.

Example Clause J, a computer-implemented method, comprising: receiving build data defining a sequence of builds for installation on a server farm, wherein individual builds of the sequence of builds include one or more patches for modifying a server application; determining a patching schedule for installation of a particular build on the server farm, the patching schedule to trigger build installations during an off-peak usage time-range that corresponds to one or more tenants of the server farm; receiving incident data indicating that a performance failure has occurred with respect to implementation of the server application; based on the incident data, identify another build that includes a particular patch, of the one or more patches, that is designed to resolve the performance failure; and overriding the patching schedule to trigger an out-of-sequence installation of the other build prior to the off-peak usage time-range.

Example Clause K, the computer-implemented method of Example Clause J, further comprising: determining a first estimated impact corresponding to waiting to resolve the performance failure until the off-peak usage time-range; and determining a second estimated impact corresponding to resolving the performance failure prior to the off-peak usage time-range, wherein the triggering the out-of-sequence installation prior to the off-peak usage time-range is responsive to the first estimated impact being greater than the second estimated impact.

Example Clause L, the computer-implemented method of any one of Example Clauses J through K, further comprising: preventing transmission, to the server farm, of one or more intermediate builds that are ordered within the sequence of builds after a last installed build and prior to the other build, wherein the one or more intermediate builds includes at least the particular build.

Example Clause M, the computer-implemented method of any one of Example Clauses J through L, wherein the other build includes one or more incremental additions of patches with respect to the one or more intermediate builds.

Example Clause N, the computer-implemented method of any one of Example Clauses J through M, wherein receiving the incident data includes identifying an association of the server farm with a flag that is indicative of the performance failure.

Example Clause O, the computer-implemented method of Example Clause N, wherein identifying the other build includes identifying another association of the particular patch with the flag that is indicative of the performance failure.

Example Clause P, the computer-implemented method of any one of Example Clauses J through O, wherein the performance failure corresponds to a software regression associated with one or more functionalities of the server application.

Example Clause Q, a system, comprising: one or more processors; a memory in communication with the one or more processors, the memory having computer-readable instructions stored thereupon which, when executed by the one or more processors, cause the one or more processors to: receive build data defining a sequence of builds that include one or more patches for modifying one or more server applications that are being executed by a plurality of server farms; determine a patching schedule that defines one or more off-peak usage times for installation of a particular build, of the sequence of builds, on the plurality of server farms; determine that a flag has been associated with a particular server farm of the plurality of server farms, wherein the flag is indicative of a performance failure associated with the particular server farm implementing the one or more server applications; based on the flag being associated with the particular server farm, analyze the build data to identify a particular patch that is designed to resolve the performance failure, wherein the particular patch is initially included within another build that is subsequent to the particular build in the sequence of builds; and trigger installation of the other build on the particular server farm prior to a particular off-peak usage time corresponding to the particular server farm.

Example Clause R, the system of Example Clause Q, wherein analyzing the build data to identify the particular patch includes monitoring the build data to determine when the particular patch becomes available for deployment to the particular server farm.

Example Clause S, the system of any one of Example Clauses Q through R, wherein identifying the particular patch includes analyzing the build data to identify that the flag that is associated with the particular server farm is also associated with the particular patch.

Example Clause T, the system of any one of Example Clauses Q through S, wherein the flag is commonly associated with the particular server farm and the particular patch based on user input received via a build engine.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A server farm patching system, comprising:
one or more processors;
a memory in communication with the one or more processors, the memory having computer-readable instructions stored thereupon which, when executed by the one or more processors, cause the one or more processors to:
receive build data defining a plurality of builds for installation on a server farm, wherein individual builds include one or more patches for modifying a server application;
determine a patching schedule for installation of the individual builds, on the server farm, during an off-peak usage time-range that corresponds to one or more tenants of the server farm;
receive, during a current peak usage time-range that corresponds to the one or more tenants of the server farm, incident data indicating that a performance failure has occurred with respect to implementation of the server application;
during the current peak usage time-range within which the incident data is received, identify a particular build, of the individual builds, that includes a particular patch that is designed to resolve the performance failure that is indicated by the incident data; and
override the patching schedule to trigger installation of the particular build onto the server farm during the current peak usage time-range within which the performance failure has occurred.

2. The server farm patching system of claim 1, wherein the computer-readable instructions further cause the one or more processors to:
identify an intermediate build that is ordered subsequent to a last-installed build and prior to the particular build; and
prevent installation of the intermediate build on the server farm.

3. The server farm patching system of claim 2, wherein the particular build includes at least one patch that is included within the intermediate build.

4. The server farm patching system of claim 1, wherein the performance failure corresponds to a software regression of the server application that results from at least one build having been installed on the server farm prior to the current peak usage time-range.

5. The server farm patching system of claim 1, wherein the computer-readable instructions further cause the one or more processors to:
determine the off-peak usage time-range based on at least one of:
a geographic region associated with the one or more tenants that are served by the server farm, or peak activity data that indicates one or more patterns of activity corresponding to the one or more tenants.

6. The server farm patching system of claim 1, wherein the computer-readable instructions are executable by the one or more processors to:

monitor an activity level associated with the one or more tenants to trigger installation of individual builds during the off-peak usage time-range when the activity level is below a threshold activity level, wherein the installation of the particular build is triggered during the current peak usage time-range in response to receiving the incident data when the activity level is above the threshold activity level.

7. The server farm patching system of claim 1, wherein the computer-readable instructions further cause the one or more processors to determine an estimated relative impact of over-riding the patching schedule to trigger installation of the particular build during the current peak usage time-range versus adhering to the patching schedule for installation of the particular build during the off-peak usage time-range.

8. A computer-implemented method, comprising:

receiving build data defining a sequence of builds for installation on a server farm, wherein individual builds include patches for modifying a server application that is executing on the server farm;

receiving a patching schedule that indicates an off-peak usage time-range for installation of the individual builds on the server farm;

receiving incident data indicating that a performance failure has occurred with respect to implementation of the server application during a current peak usage time-range, wherein the current peak usage time-range occurs prior to the off-peak usage time-range;

identifying, during the current peak usage time-range within which the incident data is received, a particular build, of the individual builds, that includes a particular patch that is designed to resolve the performance failure; and overriding the patching schedule to cause the particular build to be installed onto the server farm during the current peak usage time-range within which the performance failure has occurred and which is prior to the off-peak usage time-range.

9. The computer-implemented method of claim 8, further comprising determining whether a first estimated impact of installing the particular build during the off-peak usage time-range is greater than a second estimated impact of installing the particular build during the current peak usage time-range, wherein the overriding the patching schedule is responsive to the first estimated impact being greater than the second estimated impact.

10. The computer-implemented method of claim 8, wherein at least one intermediate build is between the particular build and a last-installed build within the sequence of builds.

11. The computer-implemented method of claim 10, further comprising preventing installation of the at least one intermediate build on the server farm.

12. The computer-implemented method of claim 8, further comprising monitoring, subsequent to receiving the incident data, the build data to determine when the particular patch becomes available for deployment to the server farm.

13. The computer-implemented method of claim 8, wherein the overriding the patching schedule results in an out-of-sequence installation of the particular build during the current peak usage time-range prior to the off-peak usage time-range.

14. The computer-implemented method of claim 8, wherein receiving the incident data includes identifying an association of the server farm with a flag that is indicative of the performance failure.

15. The computer-implemented method of claim 14, wherein identifying the particular build includes identifying an association of the particular patch with the flag that is indicative of the performance failure.

16. The computer-implemented method of claim 8, wherein the performance failure corresponds to a software regression associated with one or more functionalities of the server application, and wherein the software regression is initially identified during the current peak usage time-range within which the patching schedule is overridden.

17. A computer-implemented method, comprising:

receiving build data defining one or more builds for installation on a server farm, wherein individual builds, of the one or more builds, include one or more patches for modifying a server application;

determining a patching schedule that defines an off-peak usage time-range, of the server farm, during which to trigger installation of the individual builds;

receiving, during a current peak usage time-range of the server farm, incident data indicating that a performance failure has occurred with respect to implementation of the server application;

analyzing the incident data during the current peak usage time-range within which the incident data is received to identify a particular build, of the individual builds, that includes a particular patch that is designed to resolve the performance failure; and causing installation of the particular build during the current peak usage time-range to resolve the performance failure during the current peak usage time-range and prior to the off-peak usage time-range.

18. The computer-implemented method of claim 17, wherein the causing the installation of the particular build during the current peak usage time-range is based at least in part on an estimated relative impact of installing the particular build during the current peak usage time-range versus the off-peak usage time-range.

19. The computer-implemented method of claim 18, wherein the estimated relative impact is determined based at least in part on an amount of time remaining within the current peak usage time-range.

20. The computer-implemented method of claim 17, further comprising causing the particular build to be installed onto a plurality of other server farms in accordance with the patching schedule.

* * * * *